(12) United States Patent
Modi

(10) Patent No.: US 10,887,031 B2
(45) Date of Patent: Jan. 5, 2021

(54) VEHICLE-BASED MEDIA SYSTEM WITH AUDIO AD AND NAVIGATION-RELATED ACTION SYNCHRONIZATION FEATURE

(71) Applicant: Gracenote, Inc., Emeryville, CA (US)

(72) Inventor: Nisarg A. Modi, San Ramon, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 16/516,035

(22) Filed: Jul. 18, 2019

(65) Prior Publication Data

US 2020/0044757 A1 Feb. 6, 2020

Related U.S. Application Data

(60) Provisional application No. 62/714,619, filed on Aug. 3, 2018, provisional application No. 62/714,621, filed
(Continued)

(51) Int. Cl.
*H04H 20/26* (2008.01)
*G10L 19/018* (2013.01)
(Continued)

(52) U.S. Cl.
CPC ......... *H04H 20/62* (2013.01); *G01C 21/3605* (2013.01); *G01C 21/3667* (2013.01);
(Continued)

(58) Field of Classification Search
CPC .... H04H 20/26; H04N 21/414; H04N 21/422; H04W 4/02; H04W 4/44; H04R 3/12; G10L 19/018
(Continued)

(56) References Cited

U.S. PATENT DOCUMENTS

| 9,904,938 B2 | 2/2018 | Hawkins et al. | |
| 2011/0098056 A1* | 4/2011 | Rhoads | G09G 5/00 |
| | | | 455/456.1 |

(Continued)

FOREIGN PATENT DOCUMENTS

| GB | 2375907 A | 11/2002 |
| JP | 2007327774 A | 12/2007 |

(Continued)

OTHER PUBLICATIONS

International Search Report dated Nov. 8, 2019 issued in connection with International Application No. PCT/US2019/043083, filed on Jul. 23, 2019, 3 pages.
(Continued)

*Primary Examiner* — Tan Q Nguyen
(74) *Attorney, Agent, or Firm* — McDonnell Boehnen Hulbert & Berghoff LLP

(57) ABSTRACT

In one aspect, an example method to be performed by a vehicle-based media system includes (a) receiving audio content; (b) causing one or more speakers to output the received audio content; (c) using a microphone of the vehicle-based media system to capture the output audio content; (d) identifying reference audio content that has at least a threshold extent of similarity with the captured audio content; (e) identifying a geographic location associated with the identified reference audio content; and (f) based at least on the identified geographic location associated with the identified reference audio content, outputting, via the user interface of the vehicle-based media system, a prompt to navigate to the identified geographic location.

20 Claims, 8 Drawing Sheets

Related U.S. Application Data on Aug. 3, 2018, provisional application No. 62/714,623, filed on Aug. 3, 2018.

(51) Int. Cl.
| | |
|---|---|
| *H04H 20/62* | (2008.01) |
| *G06Q 30/02* | (2012.01) |
| *H04W 4/02* | (2018.01) |
| *H04W 4/44* | (2018.01) |
| *G01C 21/36* | (2006.01) |
| *H04R 3/12* | (2006.01) |
| *H04N 21/414* | (2011.01) |
| *H04N 21/422* | (2011.01) |
| *G10L 15/26* | (2006.01) |
| *H04N 21/81* | (2011.01) |

(52) U.S. Cl.
CPC ..... *G01C 21/3697* (2013.01); *G06Q 30/0239* (2013.01); *G06Q 30/0266* (2013.01); *G06Q 30/0267* (2013.01); *G06Q 30/0277* (2013.01); *G10L 15/26* (2013.01); *G10L 19/018* (2013.01); *H04N 21/41422* (2013.01); *H04N 21/42203* (2013.01); *H04R 3/12* (2013.01); *H04W 4/023* (2013.01); *H04W 4/44* (2018.02); *H04N 21/812* (2013.01); *H04R 2499/13* (2013.01)

(58) Field of Classification Search
USPC ........................................................ 701/408
See application file for complete search history.

(56) References Cited

U.S. PATENT DOCUMENTS

| | | |
|---|---|---|
| 2014/0172961 A1 | 6/2014 | Clemmer et al. |
| 2014/0351053 A1 | 11/2014 | Link, II |
| 2015/0319506 A1 | 11/2015 | Kansara et al. |
| 2016/0356612 A1 | 12/2016 | Beaurepaire |
| 2019/0171410 A1* | 6/2019 | Oskarsson .............. G06F 3/165 |

FOREIGN PATENT DOCUMENTS

| | | |
|---|---|---|
| JP | 4454946 B2 | 4/2010 |
| KR | 1020090057813 | 6/2009 |
| KR | 1020140051630 | 5/2014 |
| KR | 1020180084582 | 7/2018 |
| WO | WO2013069060 A1 | 5/2013 |

OTHER PUBLICATIONS

International Search Report dated Nov. 8, 2019 issued in connection with International Application No. PCT/US2019/043085, filed on Jul. 23, 2019, 3 pages.

Written Opinion of the International Searching Authority dated Nov. 8, 2019 issued in connection with International Application No. PCT/US2019/043083, filed on Jul. 23, 2019, 4 pages.

Written Opinion of the International Searching Authority dated Nov. 8, 2019 issued in connection with International Application No. PCT/US2019/043085, filed on Jul. 23, 2019, 7 pages.

\* cited by examiner

VEHICLE-BASED MEDIA SYSTEM WITH AUDIO AD AND NAVIGATION-RELATED ACTION SYNCHRONIZATION FEATURE

CROSS-REFERENCE TO RELATED APPLICATIONS

This application claims priority to U.S. Provisional Patent Application No. 62/714,619, filed on Aug. 3, 2018, U.S. Provisional Patent Application No. 62/714,621, filed on Aug. 3, 2018, and U.S. Provisional Patent Application No. 62/714,623, filed on Aug. 3, 2018, each of which is hereby incorporated by reference in its entirety. Additionally, this application hereby incorporates by reference the following U.S. patent applications, each filed on the same date as the present application: U.S. patent application Ser. No. 16/516,029, titled "Vehicle-Based Media System with Audio Ad and Visual Content Synchronization Feature" and U.S. patent application Ser. No. 16/516,045, titled "Vehicle-Based Media System with Audio Advertisement and External-Device Action Synchronization Feature".

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

BACKGROUND

Vehicle-based media systems can receive media content to be presented to an occupant of a vehicle. For example, a vehicle-based media system can include an antenna configured to receive a radio signal, such as a satellite radio signal or a terrestrial radio signal, that is carrying audio content, and the vehicle-based media system can output the audio content through one or more speakers located within the vehicle.

SUMMARY

In one aspect, an example vehicle-based media system is disclosed. The example vehicle-based media system comprises (a) a user interface, (b) a microphone, (c) one or more processors, and (d) a non-transitory, computer-readable medium storing instructions that, when executed by the one or more processors, cause the vehicle-based media system to perform a set of acts comprising: (a) receiving audio content; (b) causing one or more speakers to output the received audio content; (c) using the microphone of the vehicle-based media system to capture the output audio content; (d) identifying reference audio content that has at least a threshold extent of similarity with the captured audio content; (e) identifying a geographic location associated with the identified reference audio content; and (f) based at least on the identified geographic location associated with the identified reference audio content, outputting, via the user interface of the vehicle-based media system, a prompt to navigate to the identified geographic location.

In another aspect, an example method to be performed by a vehicle-based media system is disclosed. The method includes (a) receiving audio content; (b) causing one or more speakers to output the received audio content; (c) using a microphone of the vehicle-based media system to capture the output audio content; (d) identifying reference audio content that has at least a threshold extent of similarity with the captured audio content; (e) identifying a geographic location associated with the identified reference audio content; and (f) based at least on the identified geographic location associated with the identified reference audio content, outputting, via a user interface of the vehicle-based media system, a prompt to navigate to the identified geographic location.

In another aspect, an example non-transitory computer-readable medium is disclosed. The computer-readable medium has stored thereon program instructions that, upon execution by a vehicle-based media system, cause the vehicle-based media system to perform a set of operations comprising (a) receiving audio content; (b) causing one or more speakers to output the received audio content; (c) using a microphone of the vehicle-based media system to capture the output audio content; (d) identifying reference audio content that has at least a threshold extent of similarity with the captured audio content; (e) identifying a geographic location associated with the identified reference audio content; and (f) based at least on the identified geographic location associated with the identified reference audio content, outputting, via a user interface of the vehicle-based media system, a prompt to navigate to the identified geographic location.

DETAILED DESCRIPTION

I. Overview

Figure 1:
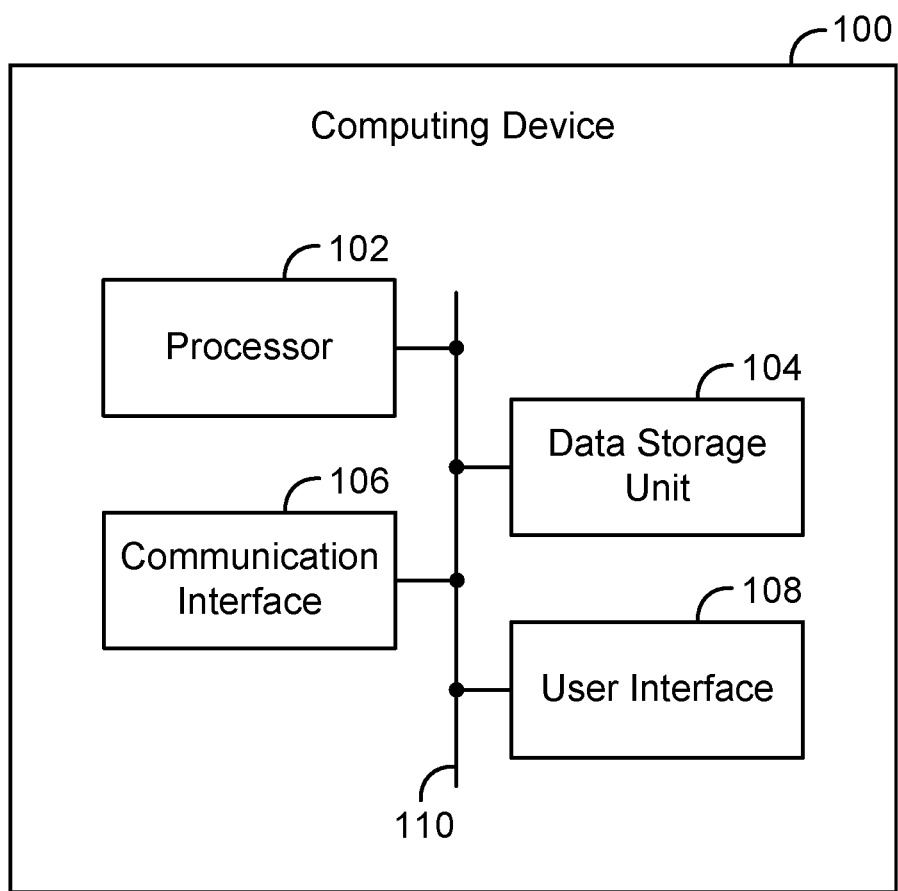
FIG. 1 is a simplified block diagram of an example computing device.

A vehicle-based media system receives audio content over a radio broadcast and presents the received audio content to an occupant of a vehicle, for instance, by playing the audio content through one or more speakers of the vehicle. The audio content received and played back by the vehicle-based media system can include various types of audio content. For instance, the audio content can include primary content, such as music, radio programs, or the like, and the audio content can include secondary content, such as advertisements, interspersed among the primary content.

Some vehicle-based media systems include a visual display for displaying visual information to an occupant of a vehicle. Such a vehicle-based media system can be configured to display information related to audio content being played back by the media system. For instance, while the media system is playing audio content, the media system can cause the visual display to display information identifying the audio content, such as a title and/or artist of a song, or identifying a source of the audio content, such as a radio station that is broadcasting the audio content. Such information to be displayed by the vehicle-based media system can be encoded in the radio broadcast that is carrying the audio content, and the vehicle-based media system can extract this information from the radio broadcast.

In practice, when the vehicle-based media system receives primary content from the radio broadcast, such as a song or a radio program, the vehicle-based media system can obtain, from the radio broadcast, and display, via its visual display, information identifying the song or radio program and/or a source of the song or radio program. For instance, for a terrestrial radio broadcast, such as a frequency modulation (FM) radio broadcast, information can be encoded into the radio signal according to the Radio Broadcast Data System (RBDS) communication protocol. Other examples are possible as well.

In some scenarios, however, the vehicle-based media system might not receive from the radio broadcast any visual information to be displayed, or the occupant of the vehicle may wish to receive additional or alternative information than that which the vehicle-based media system receives from the radio broadcast. For instance, when the vehicle-based media system receives secondary content, such as an advertisement, from the radio broadcast, the radio signal may not be encoded with visual information for display by the vehicle-based media system, or the radio signal may merely be encoded with visual information identifying the radio station broadcasting the advertisement or with various other visual information unrelated to the content of the advertisement. However, an occupant of the vehicle may wish to obtain further information about the advertisement, and/or a business associated with the advertisement may wish to provide further information to the occupant of the vehicle.

Disclosed herein are methods and systems to address this and potentially other issues. In an example method, while a vehicle-based media system is presenting an audio advertisement, the vehicle-based media system determines an audio fingerprint of the advertisement and the vehicle-based media system also determines location data associated with the vehicle. The location data can include a current location of the vehicle, a destined location of the vehicle, or some location on a route between the current and destined locations of the vehicle, as obtained from a navigation system of the vehicle. The vehicle-based media system uses both the determined audio fingerprint of the advertisement and the location data associated with the vehicle to select and perform a navigation-related action.

In a further aspect, the vehicle-based media system can receive different kinds of audio content. This received audio content can also be different types of audio content, including music by various artists or other radio programs (collectively, "entertainment content") and/or audio advertisements (collectively, "advertisement content").

Once this audio content is received, the vehicle-based media system may also cause one or more speakers in (or around) the vehicle to output the received audio content, and then, using a microphone of the system, capture the outputted audio content. In some examples, the vehicle-based media system can also selectively capture the audio content based on various attributes of the received audio content (e.g., capturing the advertisement content).

The vehicle-based media system may also identify reference audio content that has at least a threshold extent of similarity with the captured audio content and can do so in various ways. For instance, the reference audio content can include a plurality of reference audio fingerprint items, and the vehicle-based media system can generate audio fingerprint data associated with the captured audio content, compare the generated audio fingerprint data to the plurality of reference audio fingerprint items, and determine that a particular reference audio fingerprint item of the plurality of reference audio fingerprint items has at least a threshold extent of similarity with the generated audio fingerprint data. In another aspect, the vehicle-based media system may do some or all of this analysis locally or using other devices and/or processes (e.g., the vehicle-based media system can send the captured audio content (or a portion thereof) to a server, and the server can generate audio fingerprint data associated with the captured audio content and/or perform the comparative analysis). And, in yet another aspect, the vehicle-based media system can also identify reference audio content based on specific audio content with specific attributes (e.g., capturing advertisement content contained in the received audio content and using the captured advertisement content to identify reference audio content).

In any case, the vehicle-based media system may also use the identified reference audio content to identify a geographic location associated with the identified reference audio content. Namely, the vehicle-based media system may use the reference audio content that has the threshold extent of similarity with the captured audio content to a geographic location associated with the underlying advertisement content. For instance, the threshold similar reference audio content can be associated with a particular geographic location, and the vehicle-based media system can retrieve the particular geographic location based on its association with the threshold similar reference audio content item.

Further, the vehicle-based media system may output, via the user interface of the vehicle-based media system, a prompt to navigate to the identified geographic location, and may do so in a number of ways. For example, the identified geographic location may be related to particular advertisement content contained in the captured audio content and may be displayed while the audio advertisement is playing in the vehicle. In a further aspect, by displaying this geographic location, the additional content can increase opportunities for (and the likelihood of) an occupant's interactions with the advertisement content. Further, displaying this geographic location corresponding to a particular advertisement may include displaying directions for navigating the occupant of the vehicle to that the displayed location, and may do so in a number of ways.

In one example, the geographic location corresponding to a particular advertisement may be a first geographic location (e.g., a nearby location of a restaurant associated with the advertisement content) and the vehicle-based media system can determine a second geographic location associated with the vehicle-based media system (e.g., the current geographic location of the vehicle in which the vehicle-based media system is located). Based on this determination, the vehicle-based media system can perform a number of additional actions, including determining a destined geographic location (e.g., the restaurant in the advertisement content) and displaying a route between the current geographic location of the vehicle-based media system and the destined geographic location. In a further aspect, prior to displaying this route, the vehicle-based media system can display a prompt for an occupant of the vehicle to determine and display the route. In yet a further aspect, the vehicle-based media system may also receive input from the occupant via the displayed prompt and, in response to receiving input from the user, display one or more nearby locations of the business associated with the advertisement content (e.g., display an indication of one or more geographic locations of the associated business).

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a radio, cellular, or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

In this disclosure, the term "computing system" means a system that includes at least one computing device, such as computing device 100. A computing system and/or components thereof can perform various acts, such as those set forth below.

In this disclosure, the term "vehicle-based media system" means a system that includes at least one computing device, such as computing device 100, and that receives and presents media content to an occupant of a vehicle. The vehicle-based media system can receive the media content using a communication interface, such as communication interface 106, and can present the media content using a user interface, such as user interface 108.

II. Example Operations

In line with the discussion above, a vehicle-based media system can receive, via a radio broadcast, an audio advertisement, and the vehicle-based media system can present the audio advertisement to an occupant of the vehicle by outputting the audio advertisement through one or more speakers of the vehicle. To enhance the occupant's experience, the vehicle-based media system can identify the advertisement and can use the identified advertisement as a basis to retrieve a geographic location associated with the identified reference audio content. The vehicle-based media system can then cause the retrieved geographic location to be presented on a display screen of the vehicle-based media system while the vehicle-based media system presents at least a portion of the advertisement. In one example use case, the vehicle-based media system can receive and present a terrestrial radio advertisement for a restaurant and while doing so, the vehicle-based media system can display one or more nearby locations of the advertised restaurant together with a prompt for displaying directions to one of the advertised restaurants.

One way to identify the advertisement being received by the vehicle-based media system is for the vehicle-based media system to generate audio fingerprint data representing the advertisement content being received by the vehicle-based media system, and for a computing system, such as a network server, to compare that audio fingerprint data with reference audio fingerprint data representing advertisement content of a known advertisement, with a fingerprint match indicating that the vehicle-based media system is receiving the known advertisement.

To do so, the vehicle-based media system may use one or more microphones to capture audio content that is played via one or more speakers in the vehicle. For instance, the vehicle-based media system may receive various audio content from a particular source (e.g., both entertainment and advertisement content contained in signals from a terrestrial radio station) and selectively capture specific audio content (e.g., advertisement content) for further analysis. To facilitate this, the vehicle-based media system may be configured to continuously monitor audio content that is being played in the vehicle during background processing and begin capturing the audio only upon recognizing one or more predetermined audio patterns. For instance, the vehicle-based media system can be configured to begin capturing audio content responsive to detecting a period of silence or lack of music content, as this can be indicative of the end of a song and the beginning of an advertisement.

In another example, the vehicle-based media system can be configured to capture audio content responsive to detecting changes in the received audio content. For instance, the vehicle-based media system can be configured to determine that the received audio content no longer includes information identifying the song or radio program and/or a source of the song or radio program, such as information encoded into the radio signal according to the RBDS communication protocol. As noted above, this encoded information might not be present when the received audio content includes advertisement content, and so the lack of this encoded information can indicate that the received audio content includes advertisement content.

In another example, the vehicle-based media system may be configured to continuously or periodically monitor the audio content that is being played in the vehicle and capture the audio content for further analysis. In some examples, the vehicle-based media system may periodically capture the audio content and perform audio analysis (e.g., fingerprinting, finding other audio content that matches the captured audio content, etc.) in real time or near real time. In other examples, however, the vehicle-based media system may periodically capture the audio content and defer audio analysis until a later time.

In still other examples, the vehicle-based media system may engage the one or more microphones to capture audio content based on the presence (or absence) or particular information in the received audio content. In some examples, the vehicle-based media system may begin capturing audio content playing back in the vehicle in response to determining that the received audio content does not contain information indicating that the audio content is musical audio content (e.g., song and/or artist title), and therefore is likely advertising content. Other examples are possible.

In any case, the vehicle-based media system can determine a fingerprint for the captured audio content, and may do so in a number of ways. For example, a network server or other such entity could establish or otherwise have access to reference audio fingerprint data representing a known advertisement. For instance, the server could receive various audio advertisements and, for each audio advertisement, could generate respective reference audio fingerprints representing the respective audio advertisements. Or the server could otherwise establish or be provisioned with these reference audio fingerprints. The fingerprints determined by the vehicle-based media system and/or the reference audio fingerprints can be generated according to any audio fingerprinting process now known or later developed.

Further, in real time as the vehicle-based media system receives an audio advertisement, the vehicle-based media system could generate query audio fingerprint data representing the audio content of the advertisement that it is receiving and could transmit the query audio fingerprint data to the server for analysis.

As the server receives the query audio fingerprint data from the vehicle-based media system, the server could compare the query audio fingerprint data with the reference audio fingerprint data of the known advertisements. And if the server thereby determines with sufficient confidence that the query audio fingerprint data matches particular reference audio fingerprint data, then the server could conclude that the advertisement being received by the vehicle-based media system is the known advertisement represented by the particular reference audio fingerprint data. Further, upon reaching such a conclusion, the server could transmit, to the vehicle-based media system, information associated with the advertisement (e.g., a logo, a brand name, etc., associated with the advertisement and/or the associated business).

In other examples, once the advertisement that is being received by the vehicle-based media system has been identified, the identified advertisement can be used as a basis to retrieve a geographic location associated with the identified reference content. For instance, the server could receive or be provisioned with respective geographic location data associated with each respective known advertisement, and the vehicle-based media system could retrieve, from the server, the respective geographic location (or locations) associated with the identified advertisement. In yet other examples, the vehicle-based media system may perform some or all of these functions locally, on the system itself.

Additionally, the vehicle-based media system can determine location data indicating a geographic location associated with a vehicle in which the vehicle-based media system is operating. For example, the vehicle-based media system can include a navigation system configured to use a GPS module to identify a current location of the vehicle and a destined location of the vehicle and to provide directions for navigating to the destined location. As such, the vehicle-based media system can query the navigation system for the current location of the vehicle, the destined location of the vehicle, or any location on a route between the current and destined locations. Other examples are possible.

The vehicle-based media system can use both the identified advertisement and the determined location data as a basis to select and perform a navigation-related action. As noted above, for instance, the vehicle-based media system can use the identified advertisement and the determined location data to navigate the vehicle to a business location associated with the identified advertisement. To facilitate this, the server could receive or be provisioned with respective location data associated with each respective known advertisement. The respective location data could include a location (e.g., an address or GPS coordinates) of a business associated with the respective advertisement. Accordingly, once the advertisement that is being received by the vehicle-based media system has been identified, the identified advertisement can be used as a basis to retrieve respective location data associated with the identified advertisement. And the vehicle-based media system can present, via its display, a prompt to navigate the vehicle to the location associated with the identified advertisement. Responsive to the occupant selecting the prompt, the vehicle-based media system can cause the navigation system to display a navigational route beginning at the vehicle's current location and ending at the location associated with the identified advertisement. The system can display this prompt in various forms and use this geographic location data in various ways, as explained in further detail below.

In one example, the vehicle-based media system can use the geographic location corresponding to a particular advertisement as a first geographic location (e.g., a nearby location of the restaurant associated with the advertisement content) and can determine a second geographic location associated with the vehicle-based media system (e.g., the current geographic location of the vehicle in which the vehicle-based media system is located). Based on this determination, the vehicle-based media system can perform a number of additional actions, including determining a destined geographic location (e.g., the restaurant in the advertisement content) and display a route between the current geographic location of the vehicle-based media system and the destined geographic location.

In yet another aspect, the vehicle-based media system, prior to displaying this route, can display a prompt for an occupant of the vehicle to navigate to the destined location and display directions, via the vehicle-based media system, to navigate the vehicle to the destined location. In yet a further aspect, the vehicle-based media system may also receive input from the occupant via the displayed prompt and, pursuant to receiving input from the user, display one or more nearby locations of the business associated with the advertisement content (e.g., display an indication of one or more geographic locations of the associated business). In this manner, the vehicle-based media system can receive and present a terrestrial radio advertisement, such as for a restaurant chain, and while doing so, the media system can display a location of one of the restaurants.

In some examples, the vehicle-based media system can also use the determined location data of the vehicle to determine whether to perform navigation-related actions (e.g., route the vehicle to a particular geographic location associated with the advertisement content). To facilitate this, the server can be further provisioned with respective location data associated with each respective advertisement. For instance, the location data for a particular advertisement can include an address or GPS coordinates of a business associated with the advertisement. In such a scenario, the vehicle-based media system can be configured to only retrieve geographic location data for advertisements that are associated with a location within a threshold proximity/distance (e.g., within a five mile radius) of the current location of the vehicle, destined location of the vehicle, or some location on a route between the current and destined locations.

Alternatively, the vehicle-based media system can determine that the vehicle location data identifies a location that is not within the threshold proximity/distance to the location associated with the particular advertisement. In such a scenario, even if a fingerprint match is detected when comparing the query audio fingerprint data with the reference audio fingerprint data of the particular advertisement, the vehicle-based media system can refrain from retrieving and displaying geographic location data associated with the matched reference fingerprint data based on the matched reference fingerprint data being associated with a location that is at least the threshold proximity/distance away from the location indicated by the vehicle location data.

Further, in some examples, location data for a particular advertisement can include location data for multiple locations. For instance, as noted above, the particular advertisement might be an advertisement for a chain of restaurants, and the location data for the particular advertisement can include location data for each restaurant of the chain of restaurants. As such, the vehicle-based media system can be configured to consider the nearest restaurant location when determining whether to perform the navigation-related action. For instance, if the nearest restaurant is within the threshold proximity/distance of the vehicle-based media system location, then the vehicle-based media system can perform the navigation-related action, such as by displaying a prompt to navigate the vehicle to the nearest restaurant location. Alternatively, if the nearest restaurant is not within the threshold proximity/distance of the vehicle-based media system location, then the vehicle-based media system can refrain from performing the navigation-related action.

Additionally or alternatively, the vehicle-based media system can also display one or more suggested geographic locations associated with the advertisement content (and directions for navigating to these to the same) based on various attributes of the received geographic location data (e.g., a prompt for navigating to the closest geographic location associated with the advertisement, the geographic location with best traffic conditions for navigating thereto, etc.).

In any event, the vehicle-based media system, an occupant's mobile device, or both may take actions that result in additional content related to the advertisement being displayed for one or more occupants and thereby increase therein interactions with (and interest in) the advertisement (and the underlying business/products/services advertised therein). In a further aspect, the vehicle-based media system may also store the associated information (e.g., reference audio content, associated visual content, the occupant's interactions with the geographic location, or all of the above) for future use by the media system.

A. Example GUIs and Operational Environments

Figure 2A:
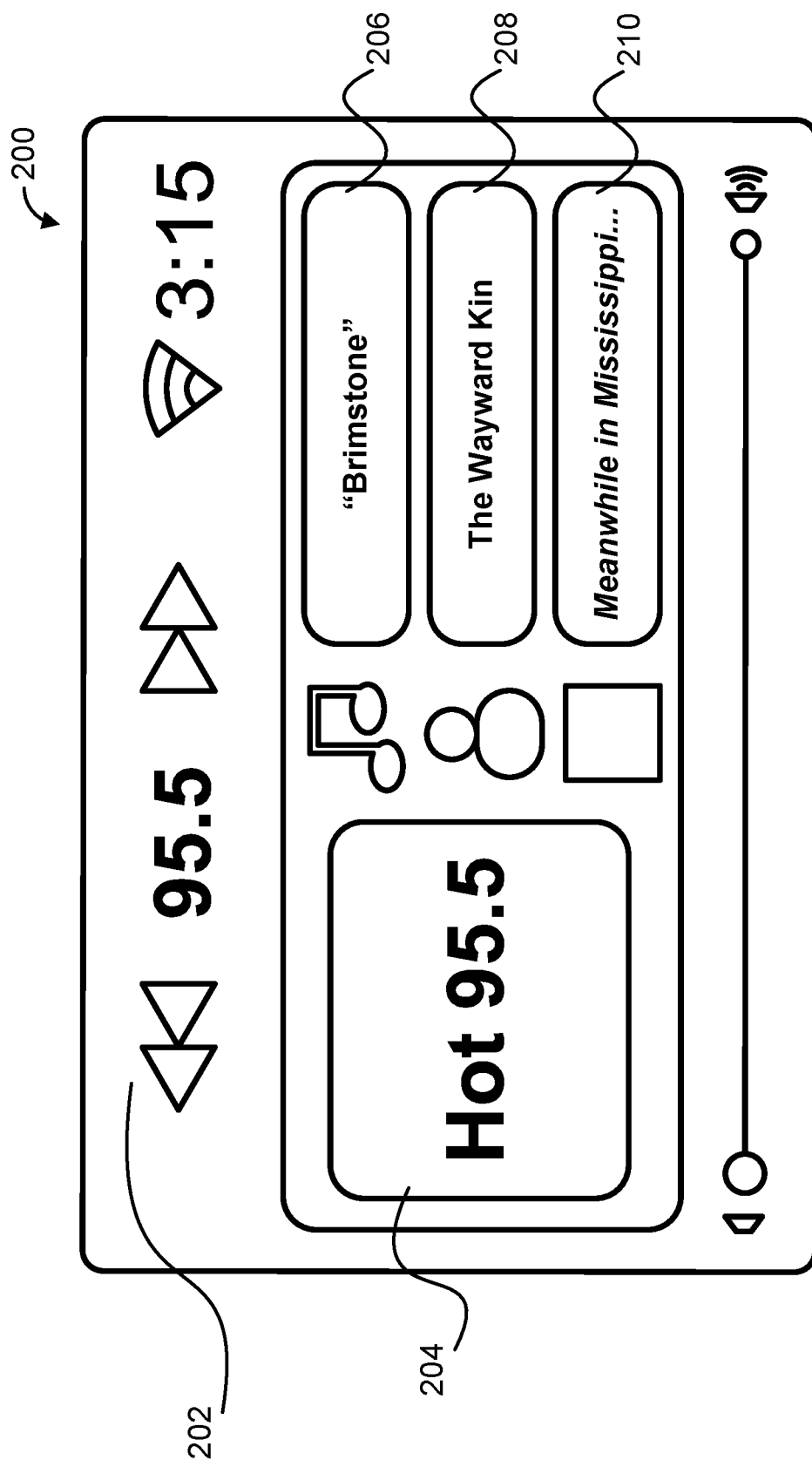
FIG. 2A is an example graphical user interface ("GUI") in a first state.
Figure 2B:
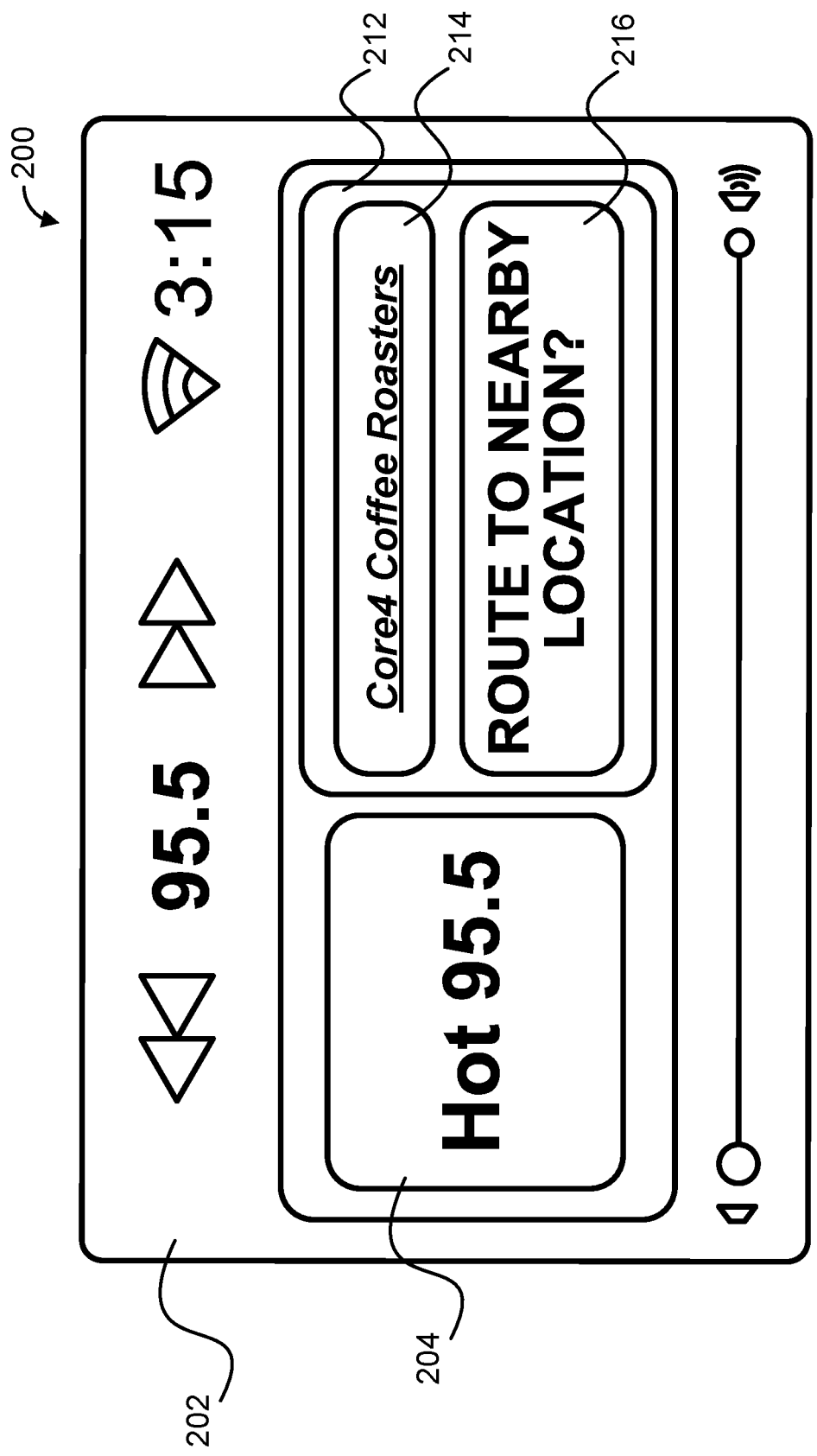
FIG. 2B is the example GUI of FIG. 2A, but in a second state.
Figure 2C:
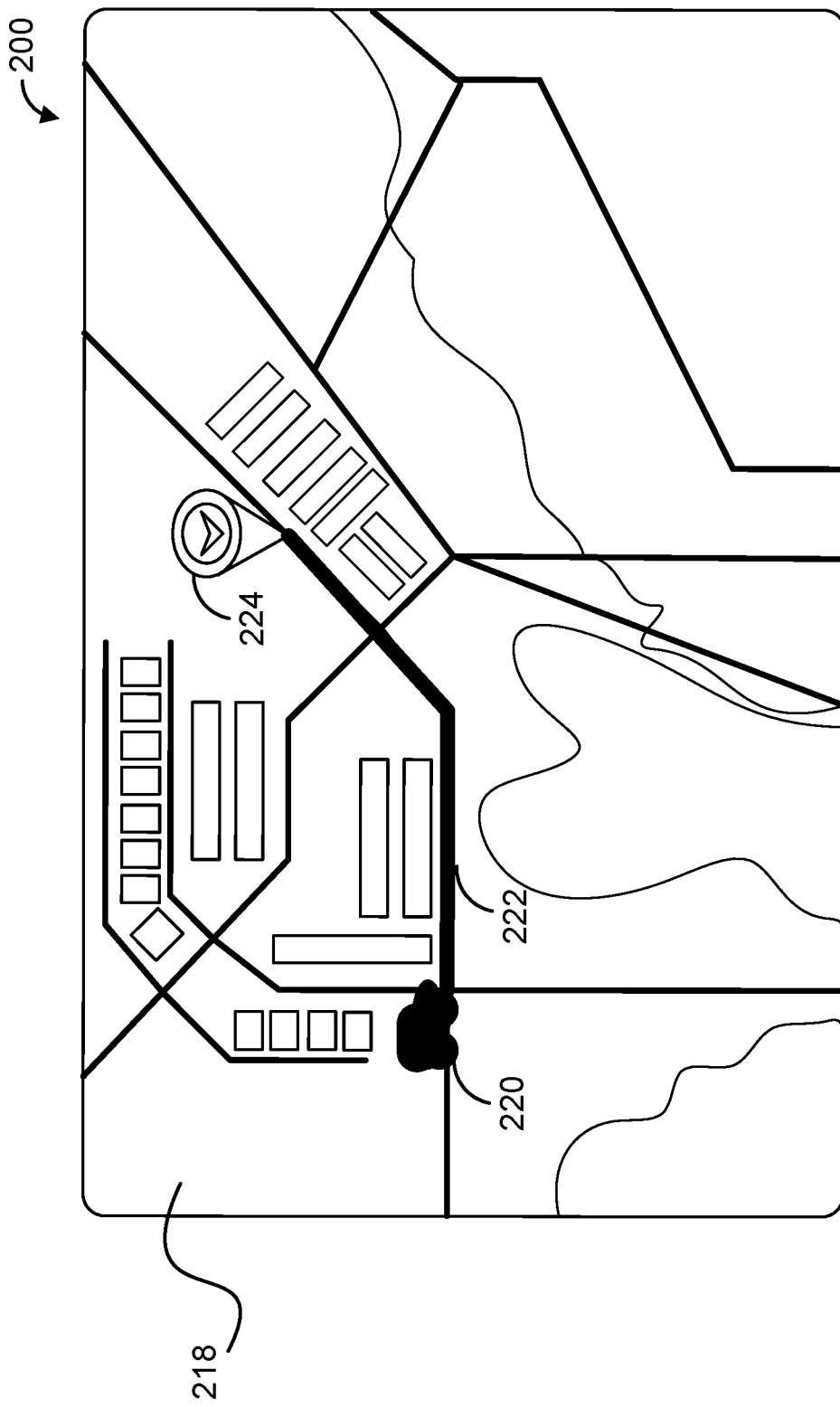
FIG. 2C is the example GUI of FIG. 2A, but in a third state.

To further illustrate the above-described concepts and others, FIGS. 2A-2C depict example GUIs that a vehicle-based media system 200 can be configured to display in accordance with the techniques described above. The vehicle-based media system 200 can include one or more computing devices similar to or the same as the computing device 100 depicted in FIG. 1. Further, the example environments and GUIs depicted in FIGS. 2A-2C are merely for purposes of illustration. The features described herein can involve environments, operations, GUIs, and functionalities that are configured or formatted differently, include additional or fewer components and/or more or less data, include different types of components and/or data, and relate to one another in different ways.

FIG. 2A depicts an example GUI of the vehicle-based media system 200 in a first state. Specifically, in this first state, the vehicle-based media system 200 displays a radio station 202 ("95.5") in connection with an associated radio station logo 204 ("Hot 95.5") and information indicating a song title 206 ("Brimstone"), artist title 208 ("The Wayward Kin"), and album title 210 ("Meanwhile in Mississippi . . . "), for musical audio content received from the displayed radio station and currently playing on one or more speakers in the vehicle. In line with the discussion above, this information can be encoded into audio content received by the vehicle-based media system, and the vehicle-based media system can extract this information from the received audio content.

Turning to FIG. 2B, FIG. 2B depicts the GUI of vehicle-based media system 200 depicted in FIG. 2A, but in a second state. In the second state, the audio content received by the vehicle-based media system 200 includes advertisement content instead of entertainment content. In this state, instead of displaying information indicating a song title 206, artist title 208, and album title 210 associated with musical audio content playing in the vehicle, vehicle-based media system 200 displays content associated with the advertisement playing on the radio station. During playout of this advertisement, the vehicle-based media system 200 captures the advertisement audio content currently playing on one or more speakers in the vehicle.

In line with the discussion above, the vehicle-based media system 200 can capture the advertisement audio content in a number of ways. For example, vehicle-based media system 200 can include one or more microphones that the vehicle-based media system 200 can use to capture audio content playing in the vehicle during an advertisement. Further, the vehicle-based media system 200 can continuously or periodically monitor audio content that is being played in the vehicle device and begin capturing audio content upon recognizing one or more predetermined audio patterns that might indicate that an advertisement is playing. In this way, the audio content in the vehicle can be continuously monitored for purposes of determining if an advertisement is playing.

In still other examples, the vehicle-based media system 200 may capture audio content in the vehicle based on the presence (or absence) or particular information in the received audio content. For example, the vehicle-based media system 200 may begin capturing audio content playing in the vehicle in response to determining that the received audio content contains information indicating that the audio content is an advertisement. For instance, the vehicle-based media system can begin capturing audio content responsive to determining that the received audio content contains embedded information that indicates the audio content is an advertisement, but does not indicate any details of the advertisement. In other examples, the vehicle-based media system 200 may begin capturing audio content playing in the vehicle in response to determining that the received audio content does not contain certain information. For example, the vehicle-based media system 200 can determine that the audio content does not contain information indicating that the audio content is musical content (e.g., song and/or artist title), and thereby determine that the audio content is more likely than not an advertisement. Other examples are possible.

The vehicle-based media system 200 can also use the captured audio content to identify reference audio content that has at least a threshold extent of similarity with the captured audio content and can do so in a number of ways.

In one example, the vehicle-based media system 200 itself can generate audio fingerprint data based on the captured audio content (e.g., by processing the captured audio content locally) and then send the generated audio fingerprint data to a second computing device (e.g., a network server) with an instruction that causes the second computing device to compare the generated audio fingerprint data to a plurality of reference audio fingerprint items and determine that one or more reference audio fingerprint items have at least a threshold extent of similarity with the generated audio fingerprint data. This similarity may indicate a match between the captured audio content and known reference audio content, thereby allowing the vehicle-based media system 200 to display information about the captured audio content based on its similarity to the known reference audio content (e.g., names and/or slogans for certain businesses).

In another example, the vehicle-based media system 200 can identify the reference audio content locally by generating audio fingerprint data of the captured audio content and comparing the generated audio fingerprint data to a plurality of locally stored reference audio fingerprint items, each of which are associated with respective reference audio content. Then, based on this comparison, the vehicle-based media system 200 can also determine that a particular reference audio fingerprint item has at least a threshold extent of similarity with the generated audio fingerprint data.

In yet another example, the vehicle-based media system 200 can send a portion of the captured audio content to an external computing device (e.g., a network server) with an instruction that causes the external computing device to compare, at least, the portion of the captured audio content to the plurality of reference audio content items. Such a comparison can involve the external computing device generating an audio fingerprint of the portion of the captured audio content and comparing the generated audio fingerprint to respective reference audio fingerprints, each of which can correspond to a respective reference audio content item. Then, once the external computing device performs this comparison, the vehicle-based media system 200 may receive, from the external computing device, an indication of a particular reference audio content item that has at least the threshold extent of similarity with the captured audio content.

Based on the results of this comparison, the vehicle-based media system 200 can also identify geographic location data associated with the reference audio content. In some examples, to identify this associated geographic location, the vehicle-based media system 200 may use the reference audio content corresponding to the fingerprint data of the advertisement to retrieve geographic location data associated with one or more advertisements, and may do so in a variety of ways. In some examples, the vehicle-based media system 200 may obtain this geographic location data from local storage and/or from other devices, among other possibilities. In a further aspect, the vehicle-based media system may identify respective geographic location data for each (or at least some) of the respective reference audio fingerprint item of the plurality of audio fingerprint items based on a variety of factors.

Further, the vehicle-based media system 200 can use this identified geographic location data in a number of ways. In one example, the vehicle-based media system 200 can display a prompt to navigate to one or more identified geographic locations related to particular advertisement while the advertisement is playing in the vehicle. In a further aspect, this prompt may contain content additional content that increases opportunities for (and the likelihood of) an occupant's interactions with the advertisement content.

For example, as shown in FIG. 2B, the vehicle-based media system 200 displays visual content 212 corresponding to a particular advertisement that includes a business logo 214 (here, "Core4 Coffee Roasters") associated with the advertisement and a navigation prompt 216 (here, "ROUTE TO NEARBY LOCATION?"). Again, this content may increase an occupant's experience with the underlying advertisement content (e.g., by providing even more content to an occupant of the vehicle when scanned by an occupant's mobile computing device). Other examples are possible.

Further, this advertising visual content 212 and associated navigation prompt 216 may be displayed at various times in connection with the underlying advertisement content. For example, advertising visual content 212 and associated navigation prompt 216 may be retrieved and displayed in real time while the underlying advertisement content is playing in the vehicle. Further, the advertising visual content 212 and associated navigation prompt 216 may be displayed only while the underlying advertisement content is playing in the vehicle, during a portion of playback for a subsequent advertisement or musical audio content, for a particular duration (e.g., 30 seconds), persistently until an occupant takes one or more predetermined actions (e.g., selects the navigation prompt 216, or closes the advertisement by interacting with the user interface of the vehicle-based media system), and/or when the vehicle's radio is turned off and/or performing other functionality (e.g., playing a CD), among other possibilities. For example, advertising visual content 212 and associated navigation prompt 216 may also be displayed the next time the vehicle is started, regardless of the audio content that is playing when the vehicle is started. Other examples and uses of associated information are possible.

Turning to FIG. 2C, the GUI of the vehicle-based media system 200 is shown in a third state, where the third state is similar to the second state depicted in FIG. 2B, in that the vehicle-based media system 200 has captured audio content, used that captured audio content to identify reference audio content having at least a threshold similarity with the captured audio content, and identified associated geographic location data. However, in this third state, the user has selected the navigation prompt 216, vehicle-based media system 200 has captured location data of the vehicle, and vehicle-based media system 200 is using that location data to identify and display directions to a nearby geographic location of the business.

Specifically, in order to reach the third state shown in FIG. 2C, at or around the time the vehicle-based media system 200 uses the microphone to capture audio content, the vehicle-based media system 200 can also determine location data of the vehicle (e.g., using GPS). As described above, the vehicle-based media system 200 can use the determined location data to filter out geographic locations associated with the advertising content that are outside a threshold proximity of the location data and instead only select one or more geographic locations that are within the threshold proximity of the vehicle-based media system 200. In this manner, the selected navigation directions are displayed for a specific location of the advertised business that is relatively near to the vehicle-based media system. As shown in FIG. 2C, the vehicle-based media system can output, in connection with the indication of the identified reference audio content, an indication of navigation directions to the nearby business via a navigation GUI 218, that can include indications of the current geographic location of the vehicle 220 and a displayed route 222 to a nearby advertised business location 224. Other examples of displayed information pertaining to this is navigational view are possible (e.g., displaying alternate navigational directions to a single determined geographic location of the advertised business, multiple navigational directions to multiple determined geographic locations of the advertised business, estimated navigational times of one more routes, traffic conditions of one or more routes, etc.). In any event, by displaying location-specific visual content, the occupant's experience with the advertisement (and thereby the advertiser) may be further improved.

Figure 3A:
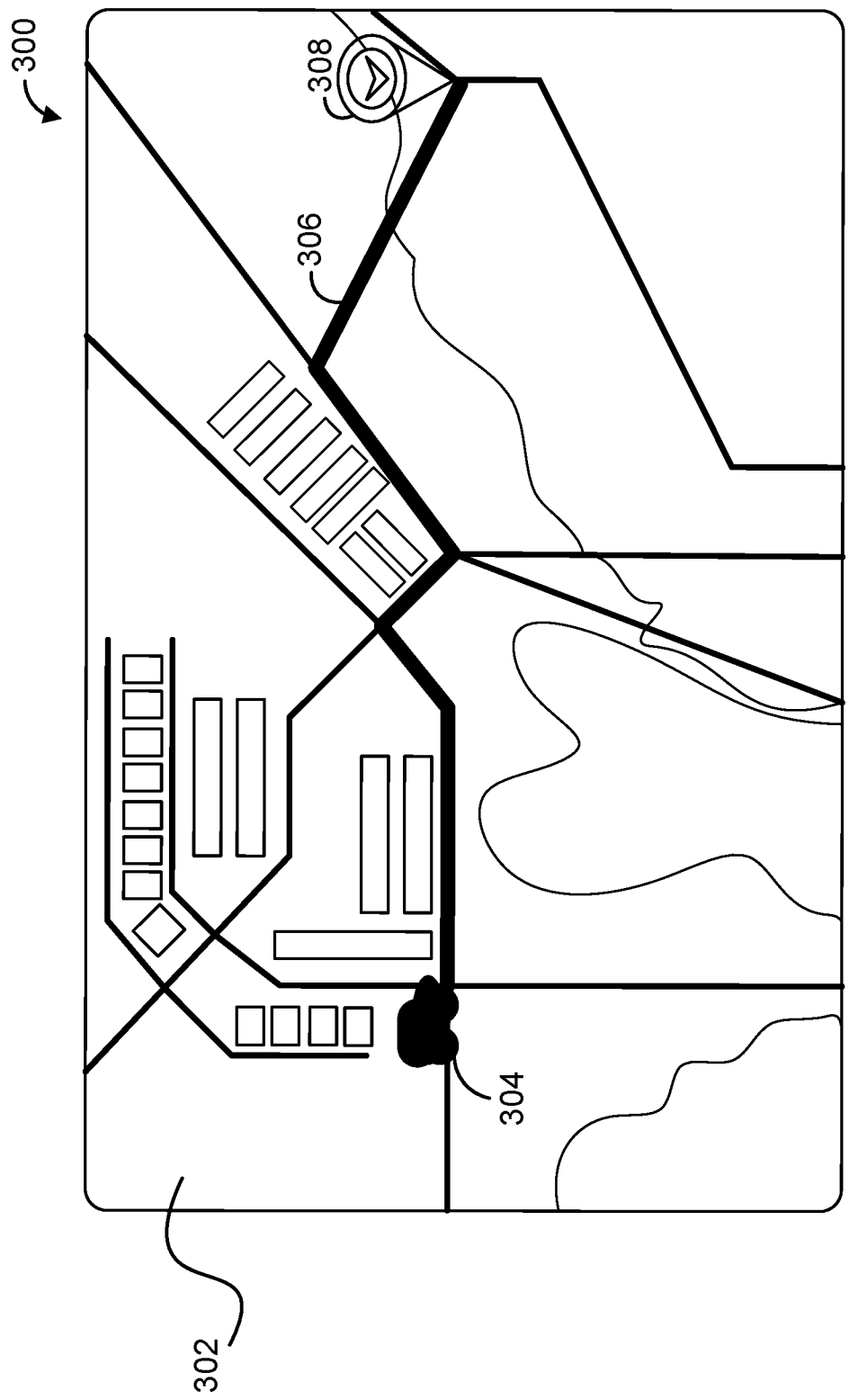
FIG. 3A is an example GUI in a first state.

FIG. 3A depicts an example GUI of the vehicle-based media system 300 in a first state. Specifically, in this first state, the vehicle-based media system 300 displays navigation GUI 302, that can include indications of the current geographic location of the vehicle 304 and a displayed route 306 to a particular destined geographic location 308. While in the first state, the vehicle-based media system 300 can concurrently receive and output audio content, including entertainment content and advertisement content interspersed among the entertainment content, as described above. Further, while in this first state, the vehicle-based media system 300 can capture the output audio content to determine whether the audio content includes known advertisement content, as also described above.

Figure 3B:
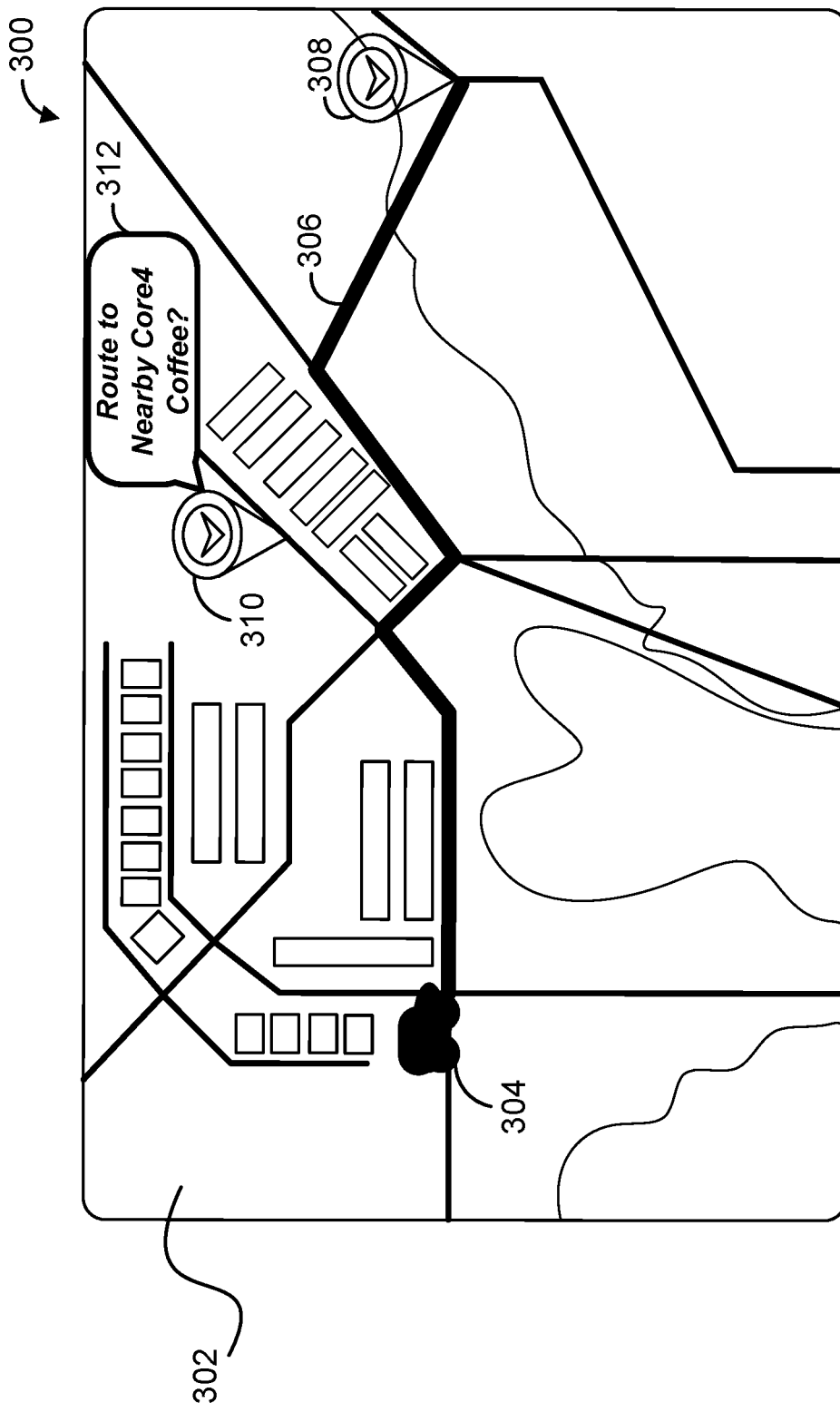
FIG. 3B is the example GUI of FIG. 3A, but in a second state.

FIG. 3B depicts the GUI of vehicle-based media system 300 depicted in FIG. 3A, but in a second state. The vehicle-based media system 300 can display the GUI in the second state in response to determining that the audio content includes a known advertisement according to the techniques described above. In the second state, vehicle-based media system 300 displays a nearby business location 310 of an advertised business and an associated navigation prompt 312 (here, "Route to Nearby Core4 Coffee Roasters?), which can be displayed concurrently with the advertisement playing on the radio station (and/or soon thereafter). To do so, in this example, during playout of this advertisement, the vehicle-based media system 300 captures the advertisement audio content currently playing on one or more speakers in the vehicle. Additionally, in line with the discussion above, this information can be encoded into audio content received by the vehicle-based media system, and the vehicle-based media system can extract this information from the received audio content.

Figure 3C:
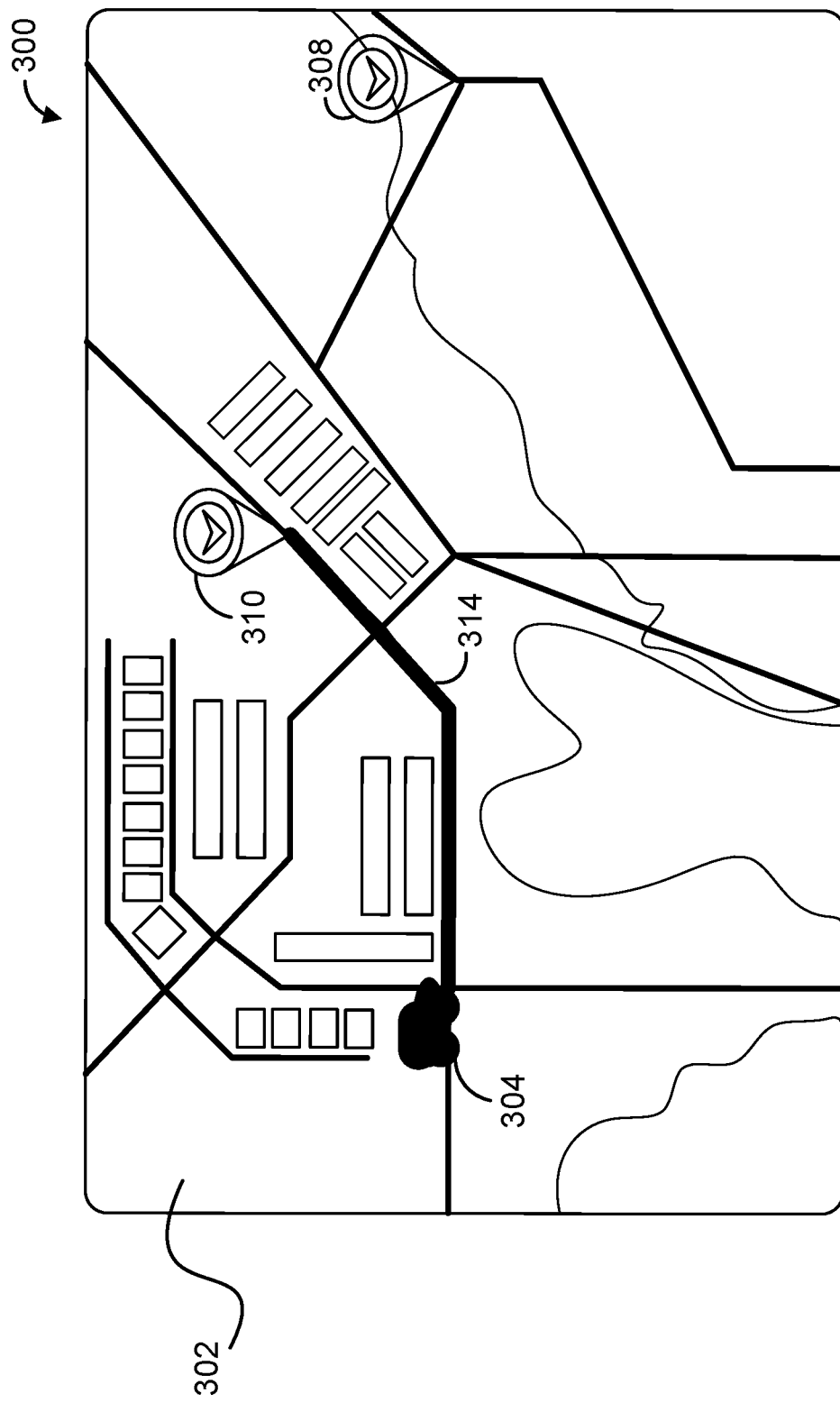
FIG. 3C is the example GUI of FIG. 3A, but in a third state.

Further, the vehicle-based media system 300 can be configured such that, in response to receiving a selection of the prompt 312, the vehicle-based media system alters the route 306. For instance, once the occupant selects the prompt 312, the vehicle-based media system 300 alters the displayed route 306 in order to navigate the vehicle to the nearby business location 310 of the advertised business. This altered route is illustrated in FIG. 3C as route 314. Other examples are possible.

B. Example Methods

Figure 4:
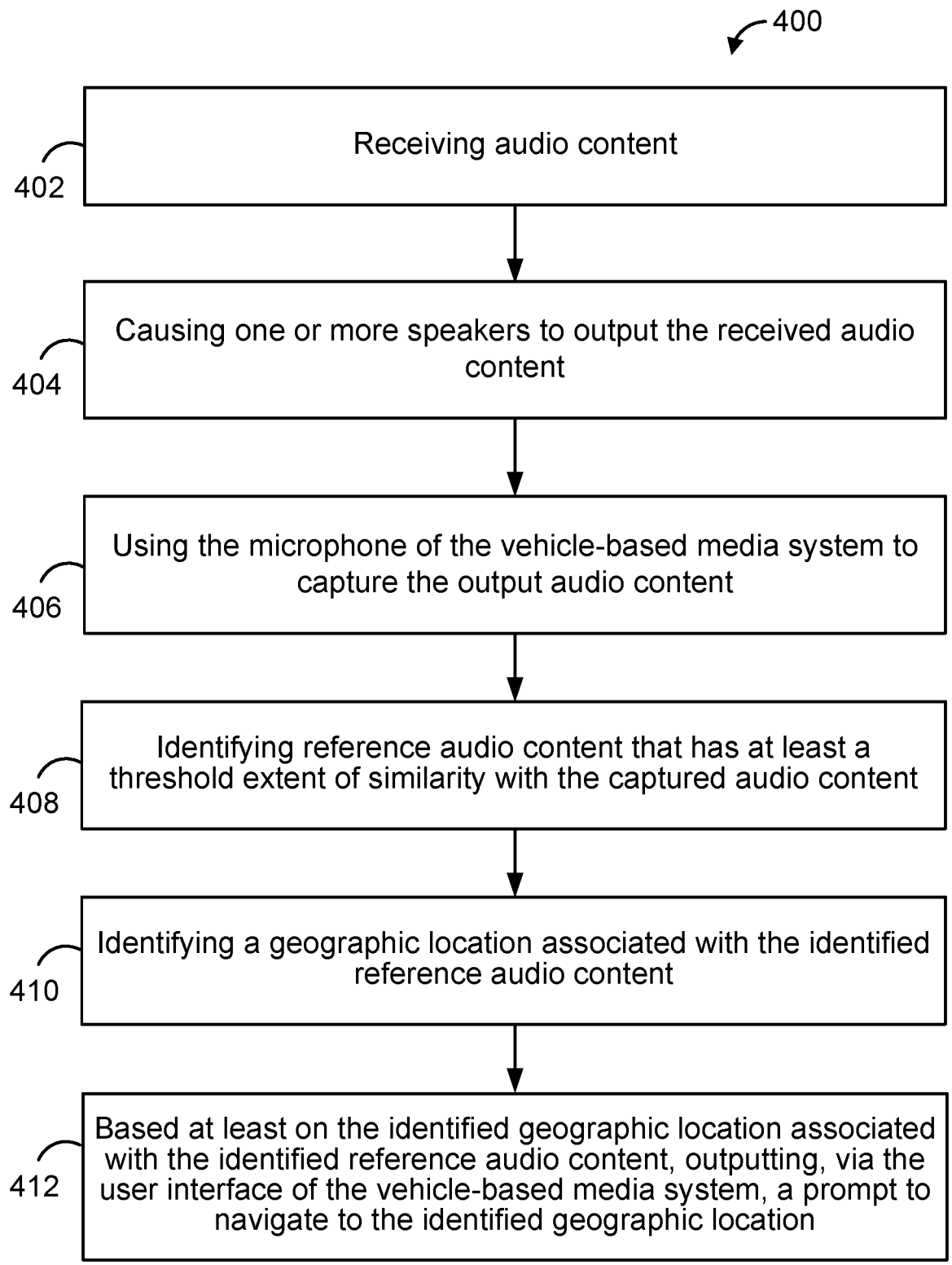
FIG. 4 is a flow chart of an example method.

FIG. 4 is a flow chart illustrating an example method 300.

At block 402, the method 400 can include receiving audio content. In some examples, receiving the audio content includes receiving primary audio content and secondary audio content, wherein the primary audio content comprises entertainment content, and wherein the secondary audio content comprises advertisement content interspersed among the primary content.

At block 404, the method 400 can include causing one or more speakers to output the received audio content. In some examples, causing the one or more speakers to output the received audio content includes causing the one or more speakers to output primary audio content (i.e., entertainment content) and secondary audio content (i.e., advertisement content).

At block 406, the method can include using the microphone of the vehicle-based media system to capture the output audio content. In some examples, using the microphone of the vehicle-based media system to capture the output audio content includes using the microphone of the vehicle-based media system to capture the secondary audio content.

At block 408, the method 400 can include identifying reference audio content that has at least a threshold extent of similarity with the captured audio content. In some examples, identifying reference audio content that has at least the threshold extent of similarity with the captured audio content includes identifying reference audio content that has at least the threshold extent of similarity with the captured secondary audio content. In some examples, identifying the reference audio content that has at least the threshold extent of similarity with the captured audio content includes: (i) generating audio fingerprint data of the captured audio content, (ii) comparing the generated audio fingerprint data to a plurality of reference audio fingerprint items, and (iii) determining that a particular reference audio fingerprint item of the plurality of reference audio fingerprint items has at least the threshold extent of similarity with the generated audio fingerprint data.

At block 410, the method 400 can include identifying a geographic location associated with the identified reference audio content. In some examples, the identified geographic location associated with the identified reference audio content is a first geographic location, and method 400 can also include determining a second geographic location associated with the vehicle-based media system. In a further aspect, determining the second geographic location associated with the vehicle-based media system can also include determining (i) a current geographic location of the vehicle-based media system, (ii) a destined geographic location of the vehicle-based media system, and/or (iii) a geographic location on a route between the current geographic location of the vehicle-based media system and the destined geographic location of the vehicle-based media system. In some examples, identifying the geographic location associated with the identified reference audio content can include identifying a geographic location related to the particular advertisement content of the secondary audio content.

At block 412, the method 400 can include, based at least on the identified geographic location associated with the identified reference audio content, outputting, via the user interface of the vehicle-based media system, a prompt to navigate to the identified geographic location. In some examples, outputting the prompt to navigate to the identified geographic location can include outputting a prompt to navigate to the first geographic location based on the first geographic location being within a threshold proximity of the second geographic location. In other examples, outputting the prompt to navigate to the identified geographic location can include, while causing the one or more speakers to output the particular advertisement content of the secondary audio content, outputting the prompt to navigate to the geographic location related to the particular advertisement content.

In some examples, the method 400 can also include receiving, via the user interface of the vehicle-based media system, a selection of the prompt to navigate to the identified geographic location and, in response to receiving the selection of the prompt, outputting, via the user interface of the vehicle-based media system, directions for navigating to the identified geographic location. As described above, this can allow the vehicle-based media system to retrieve and display location-specific content to the occupants of the vehicle (e.g., directions to a nearby location of the advertised business), potentially while the advertisement is playing in the vehicle.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects.

The invention claimed is:

1. A vehicle-based media system comprising:
a user interface;
a microphone;
one or more processors; and
a non-transitory, computer-readable medium storing instructions that, when executed by the one or more processors, cause the vehicle-based media system to perform a set of operations comprising:
receiving audio content;
causing one or more speakers to output the received audio content;
using the microphone of the vehicle-based media system to capture the output audio content;
identifying reference audio content that has at least a threshold extent of similarity with the captured audio content;
identifying a geographic location associated with the identified reference audio content; and
based at least on the identified geographic location associated with the identified reference audio content, outputting, via the user interface of the vehicle-based media system, a prompt to navigate to the identified geographic location.

2. The vehicle-based media system of claim 1, wherein the identified geographic location associated with the identified reference audio content is a first geographic location, wherein the set of operations further comprises determining a second geographic location associated with the vehicle-based media system, and wherein outputting the prompt to navigate to the identified geographic location comprises outputting a prompt to navigate to the first geographic location based on the first geographic location being within a threshold proximity of the second geographic location.

3. The vehicle-based media system of claim 2, wherein determining the second geographic location associated with the vehicle-based media system comprises determining (i) a current geographic location of the vehicle-based media system, (ii) a destined geographic location of the vehicle-based media system, or (iii) a geographic location on a route between the current geographic location of the vehicle-based media system and the destined geographic location of the vehicle-based media system.

4. The vehicle-based media system of claim 1, wherein receiving the audio content comprises receiving primary audio content and secondary audio content, wherein causing the one or more speakers to output the received audio content comprises causing the one or more speakers to output the primary audio content and the secondary audio content, wherein the primary audio content comprises entertainment content, and wherein the secondary audio content comprises advertisement content interspersed among the primary content.

5. The vehicle-based media system of claim 4, wherein:
using the microphone of the vehicle-based media system to capture the output audio content comprises using the microphone of the vehicle-based media system to capture the secondary audio content; and
identifying reference audio content that has at least the threshold extent of similarity with the captured audio content comprises identifying reference audio content that has at least the threshold extent of similarity with the captured secondary audio content.

6. The vehicle-based media system of claim 5, wherein identifying the geographic location associated with the identified reference audio content comprises identifying a geographic location related to particular advertisement content of the secondary audio content, and wherein outputting the prompt to navigate to the identified geographic location comprises, while causing the one or more speakers to output the particular advertisement content of the secondary audio content, outputting the prompt to navigate to the geographic location related to the particular advertisement content.

7. The vehicle-based media system of claim 1, wherein the set of operations further comprises:
receiving, via the user interface of the vehicle-based media system, a selection of the prompt to navigate to the identified geographic location; and
in response to receiving the selection of the prompt, outputting, via the user interface of the vehicle-based media system, directions for navigating to the identified geographic location.

8. The vehicle-based media system of claim 1, wherein identifying the reference audio content that has at least the threshold extent of similarity with the captured audio content comprises:
generating audio fingerprint data of the captured audio content;
comparing the generated audio fingerprint data to a plurality of reference audio fingerprint items; and
determining that a particular reference audio fingerprint item of the plurality of reference audio fingerprint items has at least the threshold extent of similarity with the generated audio fingerprint data.

9. A method to be performed by a vehicle-based media system, the method comprising:
receiving audio content;
causing one or more speakers to output the received audio content;
using a microphone of the vehicle-based media system to capture the output audio content;
identifying reference audio content that has at least a threshold extent of similarity with the captured audio content;
identifying a geographic location associated with the identified reference audio content; and
based at least on the identified geographic location associated with the identified reference audio content, outputting, via a user interface of the vehicle-based media system, a prompt to navigate to the identified geographic location.

10. The method of claim 9, wherein the identified geographic location associated with the identified reference audio content is a first geographic location, wherein the method comprises determining a second geographic location associated with the vehicle-based media system, and wherein outputting the prompt to navigate to the identified geographic location comprises outputting a prompt to navigate to the first geographic location based on the first geographic location being within a threshold proximity of the second geographic location.

11. The method of claim 10, wherein determining the second geographic location associated with the vehicle-based media system comprises determining (i) a current geographic location of the vehicle-based media system, (ii) a destined geographic location of the vehicle-based media system, or (iii) a geographic location on a route between the current geographic location of the vehicle-based media system and the destined geographic location of the vehicle-based media system.

12. The method of claim 9, wherein receiving the audio content comprises receiving primary audio content and secondary audio content, wherein causing the one or more speakers to output the received audio content comprises causing the one or more speakers to output the primary audio content and the secondary audio content, wherein the primary audio content comprises entertainment content, and wherein the secondary audio content comprises advertisement content interspersed among the primary content.

13. The method of claim 12, wherein:
using the microphone of the vehicle-based media system to capture the output audio content comprises using the microphone of the vehicle-based media system to capture the secondary audio content; and
identifying reference audio content that has at least the threshold extent of similarity with the captured audio content comprises identifying reference audio content that has at least the threshold extent of similarity with the captured secondary audio content.

14. The method of claim 13, wherein identifying the geographic location associated with the identified reference audio content comprises identifying a geographic location related to particular advertisement content of the secondary audio content, and wherein outputting the prompt to navigate to the identified geographic location comprises, while causing the one or more speakers to output the particular advertisement content of the secondary audio content, outputting the prompt to navigate to the geographic location related to the particular advertisement content.

15. The method of claim 9, wherein the method further comprises:
receiving, via the user interface of the vehicle-based media system, a selection of the prompt to navigate to the identified geographic location; and
in response to receiving the selection of the prompt, outputting, via the user interface of the vehicle-based media system, directions for navigating to the identified geographic location.

16. The method of claim 9, wherein identifying the reference audio content that has at least the threshold extent of similarity with the captured audio content comprises:
generating audio fingerprint data of the captured audio content;
comparing the generated audio fingerprint data to a plurality of reference audio fingerprint items; and
determining that a particular reference audio fingerprint item of the plurality of reference audio fingerprint items has at least the threshold extent of similarity with the generated audio fingerprint data.

17. A non-transitory, computer-readable medium, having stored thereon program instructions that, upon execution by a vehicle-based media system, cause the vehicle-based media system to perform a set of operations comprising:
receiving audio content;
causing one or more speakers to output the received audio content;
using a microphone of the vehicle-based media system to capture the output audio content;
identifying reference audio content that has at least a threshold extent of similarity with the captured audio content;
identifying a geographic location associated with the identified reference audio content; and
based at least on the identified geographic location associated with the identified reference audio content, outputting, via a user interface of the vehicle-based media system, a prompt to navigate to the identified geographic location.

18. The non-transitory, computer-readable medium of claim 17, wherein the identified geographic location associated with the identified reference audio content is a first geographic location, wherein the set of operations further comprises determining a second geographic location associated with the vehicle-based media system, and wherein outputting the prompt to navigate to the identified geographic location comprises outputting a prompt to navigate to the first geographic location based on the first geographic location being within a threshold proximity of the second geographic location.

19. The non-transitory, computer-readable medium of claim 18, wherein determining the second geographic location associated with the vehicle-based media system comprises determining (i) a current geographic location of the vehicle-based media system, (ii) a destined geographic location of the vehicle-based media system, or (iii) a geographic location on a route between the current geographic location of the vehicle-based media system and the destined geographic location of the vehicle-based media system.

20. The non-transitory, computer-readable medium of claim 17, wherein:

receiving the audio content comprises receiving primary audio content and secondary audio content, the primary audio content comprising entertainment content, and the secondary audio content comprising advertisement content interspersed among the primary content, causing the one or more speakers to output the received audio content comprises causing the one or more speakers to output the primary audio content and the secondary audio content, using the microphone of the vehicle-based media system to capture the output audio content comprises using the microphone of the vehicle-based media system to capture the secondary audio content, identifying reference audio content that has at least the threshold extent of similarity with the captured audio content comprises identifying reference audio content that has at least the threshold extent of similarity with the captured secondary audio content, identifying the geographic location associated with the identified reference audio content comprises identifying a geographic location related to particular advertisement content of the secondary audio content, and outputting the prompt to navigate to the identified geographic location comprises, while causing the one or more speakers to output the particular advertisement content of the secondary audio content, outputting the prompt to navigate to the geographic location related to the particular advertisement content.

\* \* \* \* \*